US012812458B2

(12) United States Patent
Johri et al.

(10) Patent No.: US 12,812,458 B2
(45) Date of Patent: Nov. 24, 2026

(54) METHOD AND SYSTEM FOR CAPACITY DECONGESTION

(71) Applicant: Rakuten Symphony, Inc., Tokyo (JP)

(72) Inventors: Prafull Johri, Indore (IN); Sudeep Kumar Jain, Indore (IN); Durgesh Rathore, Indore (IN); Nilesh Bankar, Indore (IN)

(73) Assignee: RAKUTEN SYMPHONY, INC., Tokyo (JP)

(*) Notice: Subject to any disclaimer, the term of this patent is extended or adjusted under 35 U.S.C. 154(b) by 653 days.

(21) Appl. No.: 18/018,667

(22) PCT Filed: Dec. 28, 2022

(86) PCT No.: PCT/US2022/054199
§ 371 (c)(1),
(2) Date: Jan. 30, 2023

(87) PCT Pub. No.: WO2024/144775
PCT Pub. Date: Jul. 4, 2024

(65) Prior Publication Data

US 2025/0097763 A1 Mar. 20, 2025

(51) Int. Cl.
*H04W 28/02* (2009.01)
*H04W 28/082* (2023.01)

(52) U.S. Cl.
CPC ... *H04W 28/0289* (2013.01); *H04W 28/0226* (2013.01); *H04W 28/082* (2023.05)

(58) Field of Classification Search
CPC ......... H04W 28/0289; H04W 28/0226; H04W 28/082
See application file for complete search history.

(56) References Cited

U.S. PATENT DOCUMENTS 8,364,155 B1 * 1/2013 Ahmed ................. H04W 16/22 455/446
9,420,602 B2 * 8/2016 Buyukkoc ........... H04W 72/566
(Continued)

FOREIGN PATENT DOCUMENTS

WO WO-2014099271 A1 * 6/2014 ........ H04W 28/0846
WO WO-2020021504 A1 * 1/2020 ........ H04W 28/0862

OTHER PUBLICATIONS

Written Opinion of the International Searching Authority dated May 2, 2023, issued in International Application No. PCT/US 22/54199.
(Continued)

*Primary Examiner* — Parth Patel
(74) *Attorney, Agent, or Firm* — Sughrue Mion, PLLC

(57) ABSTRACT

Provided are a system and method of decongesting a highly utilized cell within a sector of a wireless telecommunications network. The method includes receiving a set of reference samples taken from a plurality of points within the wireless telecommunications network within a predetermined time period, calculating, based on the set of reference samples, a first data volume comprising a sum of a total data volume for all highly utilized cells within the sector containing the highly utilized cell, calculating, based on the set of reference samples, a first total expected traffic offload value, determining whether the first total expected traffic offload value is greater than a predetermined percentage of the first data volume, and based on determining that the first total expected traffic offload value is greater than the predetermined percentage of the first data volume, generating an output for decongesting the cell.

20 Claims, 11 Drawing Sheets

(56) References Cited

U.S. PATENT DOCUMENTS

| | | | | |
|---|---|---|---|---|
| 10,609,615 | B2 * | 3/2020 | Belghoul | H04W 36/324 |
| 11,582,668 | B1 * | 2/2023 | Thantharate | H04W 48/18 |
| 12,166,544 | B2 * | 12/2024 | Ramakrishna | H04B 17/345 |
| 12,348,582 | B2 * | 7/2025 | Reddy | H04L 69/40 |
| 2011/0280130 | A1 * | 11/2011 | Foottit | H04W 28/0284 370/236 |
| 2013/0021933 | A1 * | 1/2013 | Kovvali | H04W 88/18 370/252 |
| 2014/0086052 | A1 * | 3/2014 | Cai | H04L 47/11 370/235 |
| 2015/0103755 | A1 * | 4/2015 | Cui | H04W 28/0284 370/329 |
| 2016/0112896 | A1 * | 4/2016 | Karampatsis | H04L 47/22 370/230.1 |
| 2016/0135076 | A1 * | 5/2016 | Grinshpun | H04W 28/0284 370/252 |
| 2016/0234120 | A1 * | 8/2016 | Yang | H04L 41/0609 |
| 2016/0295466 | A1 * | 10/2016 | da Silva | H04W 36/0088 |
| 2017/0156078 | A1 * | 6/2017 | Lee | H04W 28/0236 |
| 2017/0272368 | A1 * | 9/2017 | Mestanov | H04L 63/105 |
| 2018/0146467 | A1 * | 5/2018 | Kim | H04W 28/065 |
| 2019/0380082 | A1 * | 12/2019 | Kim | H04W 36/085 |
| 2020/0120564 | A1 * | 4/2020 | Liu | H04W 36/22 |
| 2020/0229206 | A1 * | 7/2020 | Badic | G05D 1/225 |
| 2021/0045007 | A1 * | 2/2021 | Stawiarski | H04W 28/0284 |
| 2021/0084557 | A1 * | 3/2021 | Song | H04L 47/125 |
| 2021/0168623 | A1 * | 6/2021 | Gupta | H04W 24/02 |
| 2021/0337391 | A1 * | 10/2021 | Sevindik | H04W 16/10 |
| 2021/0352529 | A1 * | 11/2021 | Sen | H04W 36/22 |
| 2022/0191737 | A1 * | 6/2022 | Mindler | H04W 28/0967 |
| 2023/0239725 | A1 * | 7/2023 | Wakim | H04W 28/0242 370/329 |
| 2025/0097763 | A1 * | 3/2025 | Johri | H04L 47/12 |

OTHER PUBLICATIONS

International Search Report issued May 2, 2023, in International Application No. PCT/US 22/54199.

* cited by examiner

Expected Traffic Offload Analysis and Report Generation
800

METHOD AND SYSTEM FOR CAPACITY DECONGESTION

This application is a National Stage of International Application No. PCT/US2022/054199 filed Dec. 28, 2022.

FIELD

Apparatuses and methods consistent with example embodiments of the present disclosure relate to a method and system for decongestion of highly utilized radio access network cells.

BACKGROUND

Cellular networks are often formed from a combination of large base stations (macro cells), outdoor small cells (ODSC), and indoor small cells (IDSC). Network congestion can occur when a given cell carries more data than it is designed to handle, which can lead to reductions in quality of service. Overloaded cells commonly encounter congestion-related issues, including queueing delay, packet loss, blocking new connections, etc., that require action by the network operator. Such actions may include deployment of additional dedicated high-speed links, such as fiber, or high-speed microwave to overloaded cells to increase capacity, or adding additional cells to offload a portion of the overloaded cell's traffic. These options can be costly, therefore it is desirable to minimize or avoid the costs associated efforts to mitigate network congestion, or where installation of new equipment is unavoidable, to optimize the placement of new equipment. Therefore, there is a need for a system and method to efficiently utilize existing network resources to offload traffic from overloaded cell's, or to alternatively propose optimal locations for proposed new cells which will in turn serve to mitigate network congestion.

SUMMARY

According to embodiments, systems and methods are provided for a capacity decongestion engine operable to process information related to network data traffic volume, existing cell sites, planned cell sites, existing alternative bandwidth at given cell sites, and potential placement of new cell sites to provide a proposal to decongest a known high use cell.

According to an aspect of the disclosure, a method of decongesting a highly utilized cell within a sector of a wireless telecommunications network ("Decongestion Target HUC") performed by at least one processor includes: receiving a set of reference samples taken from a plurality of points within the wireless telecommunications network within a predetermined time period; calculating, based on the set of reference samples, a first data volume comprising a sum of a total data volume for all highly utilized cells within the sector containing the Decongestion Target HUC; calculating, based on the set of reference samples, a first total expected traffic offload value, wherein the first total expected traffic offload value comprises the sum of a total expected traffic offload from one or more existing planned cell sites, a total expected traffic offload from one or more potential IDSC sites, and a total expected traffic offload from one or more available alternative carriers; determining whether the first total expected traffic offload value is greater than a predetermined percentage of the first data volume; and based on determining that the first total expected traffic offload value is greater than the predetermined percentage of the first data volume, generating one or more outputs configured to implement a decongestion of the Decongestion Target HUC.

The method of decongestion may also include, based on determining that the first total expected traffic offload value is less than or equal to the predetermined percentage of the first data volume: identifying a first group of sites comprising planned or operational macro or ODSC sites located within a predetermined distance of the Decongestion Target HUC; based on the first group of sites comprising at least one site, calculating an average distance between the Decongestion Target HUC and each site included in the first group of sites ("the Average ISD"); identifying, within the first group of sites, a second group of sites, wherein each site among the second group of sites is located within the main beam of the Decongestion Target HUC; based on determining that the second group of sites comprises at least one site: identifying a nearest site from among the second group of sites, wherein the nearest site is a site from among the second group of sites that is closest to the Decongestion Target HUC, and determining whether the nearest site is located a distance from the Decongestion Target HUC that is less than a product of 1.5 and the Average ISD; based on determining that the nearest site is located at a distance from the Decongestion Target Site that is less than the product of 1.5 and the Average ISD, determining whether a one or more planned ODSC sites are located at a distance from the Decongestion Target Site that is within the predetermined range; based on determining that the one or more planned ODSC sites are located at a distance from the Decongestion Target Site within the predetermined range, calculating, based on the set of reference samples, a second data volume comprising a sum of a total data volume for each highly utilized cell that is located within the sector containing the Decongestion Target HUC and that is also located within a predetermined radius of a planned ODSC site from among the one or more planned ODSC sites determined to be located within the predetermined range of the Decongestion Target Site; calculating a second total traffic offload value comprising the sum of the second data volume and the first total traffic offload value; determining whether the second total expected traffic offload value is greater than the predetermined percentage of the first data volume; and based on determining that the second total expected traffic offload value is greater than the predetermined percentage of the first data volume, generating one or more outputs configured to implement a decongestion of the Decongestion Target HUC.

The method of decongestion may also include: based on determining that the second total expected traffic offload value is less than or equal to the predetermined percentage of the first data volume, generating one or more outputs configured to implement a decongestion of the Decongestion Target HUC, wherein the one or more outputs comprises an indication that decongestion of the Decongestion Target HUC may not result in decongestion of the sector containing the Decongestion Target HUC.

The method of decongestion may also include: based on determining that either the second group of sites does not comprise at least one site or determining that the nearest site is not located at a distance from the Decongestion Target Site less than the product of 1.5 and the Average ISD, proposing a new macro site location comprising a location midway between the Decongestion Target HUC and a site from among the first group of sites, wherein the site from among the first group of sites is the closest to the Decongestion Target HUC from among the first group of sites and shares a common azimuth with the Congestion Target HUC; identifying a third group of sites comprising planned or operational macro or ODSC sites located within a predetermined distance of the new macro site location; based on the third group of sites comprising at least one site, calculating an average distance between the new macro site location and each site included in the third group of sites ("the New Site Average ISD"); determining whether one or more sites included in the third group of sites are located a distance from the new macro site location that is less than or equal to a distance equal to a product of 0.75 and the New Site Average ISD; based on determining that one or more sites included in the third group of sites are located a distance from the new macro site location that is less than or equal to the distance equal to the product of 0.75 and the New Site Average ISD, determining whether a one or more planned ODSC sites are located at a distance from the Decongestion Target Site that is within the predetermined range; based on determining that the one or more planned ODSC sites are located at a distance from the Decongestion Target Site within the predetermined range, calculating, based on the set of reference samples, a second data volume comprising a sum of a total data volume for each highly utilized cell that is located within the sector containing the Decongestion Target HUC and that is also located within a predetermined radius of a planned ODSC site from among the one or more planned ODSC sites determined to be located within the predetermined range of the Decongestion Target Site; calculating a second total traffic offload value comprising the sum of the second data volume and the first total traffic offload value; determining whether the second total expected traffic offload value is greater than the predetermined percentage of the first data volume; and based on determining that the second total expected traffic offload value is greater than the predetermined percentage of the first data volume, generating one or more outputs configured to implement a decongestion of the Decongestion Target HUC.

The method of decongestion may also include: based on determining that none of the sites included in the third group of sites are located a distance from the new macro site location that is less than or equal to a distance equal to a product of 0.75 and the New Site Average ISD: identifying a first group of highly utilized cells comprising each highly utilized cell located within the sector containing the Decongestion Target HUC that is located less than or equal to a distance equal to a product of 0.5 and distance between the new macro site location and the Decongestion Target HUC; calculating, based on the set of reference samples, a third data volume comprising a sum of a total data volume for each highly utilized cell within the first group of highly utilized cells; calculating a third total traffic offload value comprising the sum of the third data volume and the first total traffic offload value; determining whether the third total expected traffic offload value is greater than the predetermined percentage of the first data volume; and based on determining that the third total expected traffic offload value is greater than the predetermined percentage of the first data volume, generating one or more outputs configured to implement a decongestion of the Decongestion Target HUC.

According to an aspect of the disclosure, a system for decongesting a highly utilized cell within a sector of a wireless telecommunications network ("Decongestion Target HUC"), includes: at least one memory configured to store at least one instruction; and at least one processor configured to access the at least one memory and to execute the at least one instruction to: receive a set of reference samples collected from a plurality of points within the telecommunications system within a predetermined time period; calculate, based on the set of reference samples, a first data volume comprising a sum of a total data volume for all highly utilized cells within the sector containing the Decongestion Target HUC; calculate, based on the set of reference samples, a first total expected traffic offload value, wherein the first total expected traffic offload value comprises the sum of a total expected traffic offload from one or more existing planned cell sites, a total expected traffic offload from one or more potential IDSC sites, and a total expected traffic offload from one or more available alternative carriers; determine whether the first total expected traffic offload value is greater than a predetermined percentage of the first data volume; and based on determining that the first total expected traffic offload value is greater than the predetermined percentage of the first data volume, generate one or more outputs configured to implement a decongestion of the Decongestion Target HUC.

The processor may be further configured to execute the at least one instruction to: based on determining that the first total expected traffic offload value is less than or equal to the predetermined percentage of the first data volume: identifying a first group of sites comprising planned or operational macro or ODSC sites located within a predetermined distance of the Decongestion Target HUC; based on the first group of sites comprising at least one site, calculating an average distance between the Decongestion Target HUC and each site included in the first group of sites ("the Average ISD"); identify, within the first group of sites, a second group of sites, wherein each site among the second group of sites is located within the main beam of the Decongestion Target HUC; based on determining that the second group of sites comprises at least one site: identify a nearest site from among the second group of sites, wherein the nearest site is a site from among the second group of sites that is closest to the Decongestion Target HUC, and determining whether the nearest site is located a distance from the Decongestion Target HUC that is less than a product of 1.5 and the Average ISD; based on determining that the nearest site is located at a distance from the Decongestion Target Site that is less than the product of 1.5 and the Average ISD, determine whether a one or more planned ODSC sites are located at a distance from the Decongestion Target Site that is within the predetermined range; based on determining that the one or more planned ODSC sites are located at a distance from the Decongestion Target Site within the predetermined range, calculating, based on the set of reference samples, a second data volume comprising a sum of a total data volume for each highly utilized cell that is located within the sector containing the Decongestion Target HUC and that is also located within a predetermined radius of a planned ODSC site from among the one or more planned ODSC sites determined to be located within the predetermined range of the Decongestion Target Site; calculate a second total traffic offload value comprising the sum of the second data volume and the first total traffic offload value; determine whether the second total expected traffic offload value is greater than the predetermined percentage of the first data volume; and based on determining that the second total expected traffic offload value is greater than the predetermined percentage of the first data volume, generate one or more outputs configured to implement a decongestion of the Decongestion Target HUC.

The processor may be further configured to execute the at least one instruction to: based on determining that the second total expected traffic offload value is less than or equal to the predetermined percentage of the first data volume, generate one or more outputs configured to implement a decongestion of the Decongestion Target HUC, wherein the one or more outputs comprises an indication that decongestion of the Decongestion Target HUC may not result in decongestion of the sector containing the Decongestion Target HUC.

The processor may be further configured to execute the at least one instruction to: based on determining that either the second group of sites does not comprise at least one site or determining that the nearest site is not located at a distance from the Decongestion Target Site less than the product of 1.5 and the Average ISD, propose a new macro site location comprising a location midway between the Decongestion Target HUC and a site from among the first group of sites, wherein the site from among the first group of sites is the closest to the Decongestion Target HUC from among the first group of sites and shares a common azimuth with the Congestion Target HUC; identify a third group of sites comprising planned or operational macro or ODSC sites located within a predetermined distance of the new macro site location; based on the third group of sites comprising at least one site, calculating an average distance between the new macro site location and each site included in the third group of sites ("the New Site Average ISD"); determine whether one or more sites included in the third group of sites are located a distance from the new macro site location that is less than or equal to a distance equal to a product of 0.75 and the New Site Average ISD; based on determining that one or more sites included in the third group of sites are located a distance from the new macro site location that is less than or equal to the distance equal to the product of 0.75 and the New Site Average ISD, determine whether a one or more planned ODSC sites are located at a distance from the Decongestion Target Site that is within the predetermined range; based on determining that the one or more planned ODSC sites are located at a distance from the Decongestion Target Site within the predetermined range, calculate, based on the set of reference samples, a second data volume comprising a sum of a total data volume for each highly utilized cell that is located within the sector containing the Decongestion Target HUC and that is also located within a predetermined radius of a planned ODSC site from among the one or more planned ODSC sites determined to be located within the predetermined range of the Decongestion Target Site; calculate a second total traffic offload value comprising the sum of the second data volume and the first total traffic offload value; determine whether the second total expected traffic offload value is greater than the predetermined percentage of the first data volume; and based on determining that the second total expected traffic offload value is greater than the predetermined percentage of the first data volume, generate one or more outputs configured to implement a decongestion of the Decongestion Target HUC.

The processor may be further configured to execute the at least one instruction to: based on determining that none of the sites included in the third group of sites are located a distance from the new macro site location that is less than or equal to a distance equal to a product of 0.75 and the New Site Average ISD: identify a first group of highly utilized cells comprising each highly utilized cell located within the sector containing the Decongestion Target HUC that is located less than or equal to a distance equal to a product of 0.5 and distance between the new macro site location and the Decongestion Target HUC; calculate, based on the set of reference samples, a third data volume comprising a sum of a total data volume for each highly utilized cell within the first group of highly utilized cells; calculate a third total traffic offload value comprising the sum of the third data volume and the first total traffic offload value; determine whether the third total expected traffic offload value is greater than the predetermined percentage of the first data volume; and based on determining that the third total expected traffic offload value is greater than the predetermined percentage of the first data volume, generate one or more outputs configured to implement a decongestion of the Decongestion Target HUC.

According to an aspect of the disclosure, a method of decongesting a highly utilized cell within a sector of a wireless telecommunications network ("Decongestion Target HUC") performed by at least one processor includes: receiving a set of reference samples collected from a plurality of points within the wireless telecommunications network during a predetermined time period; calculating, based on the set of reference samples, a first data volume comprising a sum of a total data volume for all highly utilized cells within the sector containing the Decongestion Target HUC; determining whether the Decongestion Target Cell is an overshooting cell, and based on determining that the Decongestion Target Cell is not an overshooting cell, identifying one or more planned macro sites within a predetermined distance of the Decongestion Target Cell, and calculating, based on the set of reference samples, a first data volume value comprising a sum of a total data volume of each highly utilized cell located within the sector containing the Decongestion Target Cell and also located within a predetermined distance from an at least one planned macro site from among the identified one or more planned macro sites, identifying one or more planned ODSC sites within a predetermined distance of the Decongestion Target Cell, and calculating, based on the set of reference samples, a second data volume value comprising a sum of a total data volume of each highly utilized cell located within the sector containing the Decongestion Target Cell and also located within a predetermined distance from an at least one planned ODSC site from among the identified one or more planned ODSC sites, identifying one or more planned IDSC sites within a predetermined distance of the Decongestion Target Cell, and calculating, based on the set of reference samples, a third data volume value comprising a sum of a total data volume of each highly utilized cell located within a building polygon of an at least one planned IDSC from among the identified one or more planned IDSC sites, and calculating a total expected traffic offload from one or more existing planned cell sites, wherein the total expected traffic offload from one or more existing planned cell sites comprises the sum of the first data volume value, the second data volume value, and the third data volume value; identify a group of candidate buildings within a predetermined distance of the Decongestion Target HUC; from among the group of candidate buildings, identify one or more IDSC candidate buildings, wherein an IDSC candidate building is identified based on a determination that, based on the set of reference samples, placement of an IDSC in a respective candidate building from among the group of candidate buildings would offload more data volume from the Decongestion Target HUC than the respective candidate building currently contributes to a total data volume of the Decongestion Target HUC; calculating, for each respective IDSC candidate building, a data volume contribution value comprising a data value contribution from each respective IDSC candidate building to each highly utilized cell within the sector containing the Decongestion Target Cell, and calculating a total expected traffic offload from one or more potential IDSC sites comprising a sum of each calculated data volume contribution value; segregating one or more highly utilized cells into sectors; determining whether an alternative carrier is available at the Decongestion Target Cell; based on determining that the alternative carrier is available at the Decongestion Target Cell, calculating, based on the set of reference samples, a total expected traffic offload to the alternative carrier comprising a percentage of a data volume of the Decongestion Target Cell which is available to be moved to the alternative carrier; calculating a first total expected traffic offload value, wherein the first total expected traffic offload value comprises the sum of the total expected traffic offload from one or more existing planned cell sites, the total expected traffic offload from one or more potential IDSC sites, and the total expected traffic offload to the available alternative carriers; determining whether the first total expected traffic offload value is greater than a predetermined percentage of the first data volume; and based on determining that the first total expected traffic offload value is greater than the predetermined percentage of the first data volume, generating one or more outputs configured to implement a decongestion of the Decongestion Target HUC.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
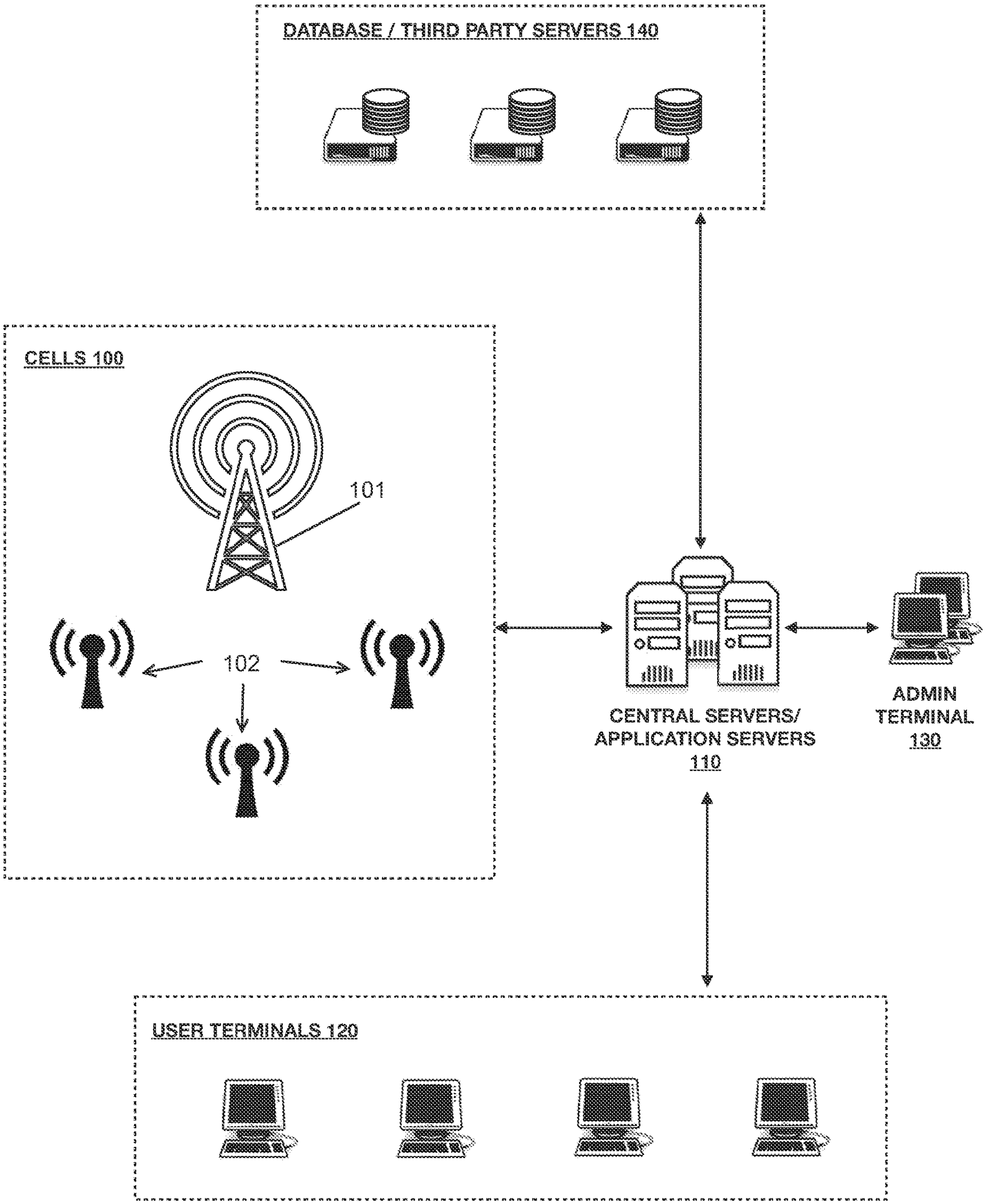
FIG. 1 illustrates a general network architecture according to one or more embodiments.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which data related to data volume, geographic location of equipment, and plans for network expansion are synthesized into a proposed plan to decongest HUC's by efficiently using existing network infrastructure or by proposing optimally located cell sites.

Figure 11:
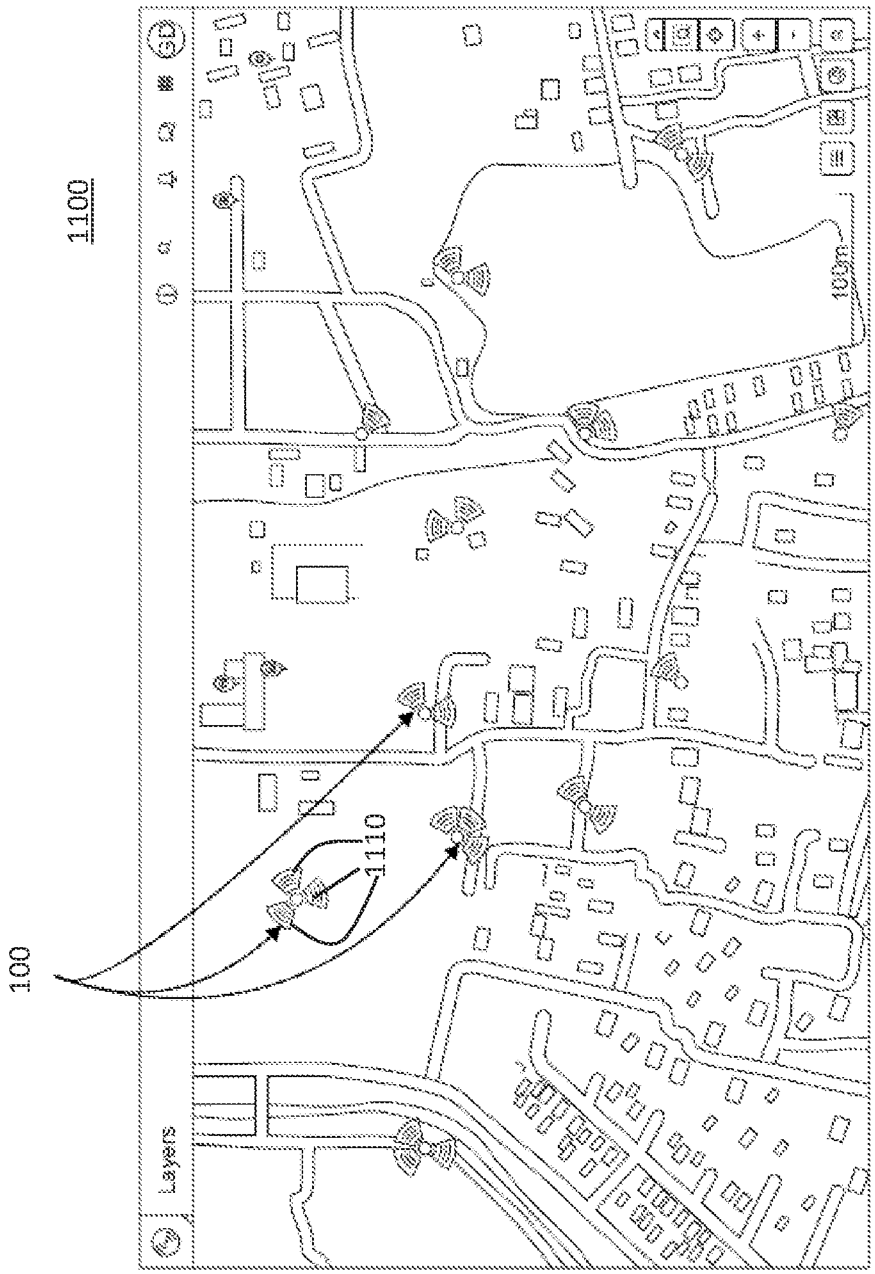
FIG. 11 is an exemplary map showing a distribution of cell sites across a geographic area.

FIG. 1 illustrates a general network architecture within which the capacity decongestion mitigation process, apparatus, computer-readable medium, and system according to one or more embodiments may be employed. Referring to FIG. 1, cells 100 can include bi-directional communication over a network with central servers or application servers 110 (e.g., via a core network). In particular, cells 100 can include any number of macro-cells, base transceivers, base stations, and small cells or nodes. For example, it is contemplated within the scope of the disclosure described herein that there may be any number of macro-cells 101 and small cells 102 (such as outdoor small cells ("ODSC") and indoor small cells ("IDSC")) to provide a cellular and wireless network (e.g., 5G, 4G, Long-Term Evolution, etc.) in a given geographical region or area. As an example, FIG. 11 shows an exemplary map 1100 depicting multiple cells 100 distributed throughout a geographic area. As shown, each cell 100 is further divided into sectors 1110 which represent the geometric space in which the antenna array of each cell 100 is focused.

It is also contemplated within the scope of the disclosure described herein that any of cells 100, including macro-cells and small cells and any variations thereof (such as femtocells, picocells, and microcells, may be referred to herein as a "highly utilized cell" (hereinafter, "HUC"). As used herein, a HUC refers to any cell (small cell or otherwise) that is highly utilized within a network or has high traffic relative to other cells within the network, has above average utilization within a network, has a degree of utilization that is above a pre-defined utilization parameter (e.g., pre-defined by a telco operator), or has a degree of utilization that meets or is above an industry recognized standard with respect to network cell utilization.

Still referring to FIG. 1, one or more user terminals 120 can also be in bi-directional communication over a network with central servers 110 (e.g., via a core network). Specifically, central servers 110 can receive and process user requests with respect to the capacity decongestion system and algorithm of one or more embodiments described herein and further report and present the results to each user terminal 120. Here, each user terminal 120 may further access and view reports and recommendations generated by the capacity decongestion system of one or more embodiments. In addition, an admin terminal 130 may also be in bi-directional communication with central servers 110 to manage and monitor various types of network data, credentials, user privileges, and the like. Further, the capacity decongestion analysis process and system according to one or more embodiments may also include one or more databases and third-party servers 140 in bi-directional communication over a network with central servers 110. Here, servers 140 can provide various types of data storage, data streams, data feeds, and/or provide various types of third-party support services to central servers 110. However, it is contemplated within the scope of the present disclosure described herein that the capacity decongestion analysis process and system of the disclosure described herein can include any type of general network architecture (e.g., including one or more radio access networks, a core network, etc.).

Still referring to FIG. 1, one or more of servers and terminals 110-140 may include a personal computer (PC), a printed circuit board comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, one or more servers and terminals 110-140 may include a set of components, such as a processor, a memory, a storage component, an input component, an output component, a communication interface, and a JSON-based UI rendering component. The set of components of the device may be communicatively coupled via a bus.

The bus may include one or more components that permit communication among the set of components of one or more of servers and terminals 110-140. For example, the bus may be a communication bus, a cross-over bar, a network, or the like. The bus may be implemented using single or multiple (two or more) connections between the set of components of one or more of servers and terminals 110-140. The disclosure is not limited in this regard.

One or more of servers and terminals 110-140 may include one or more processors. The one or more processors may be implemented in hardware, firmware, and/or a combination of hardware and software. For example, the one or more processors may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The one or more processors also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The one or more processors may control overall operations of one or more of servers and terminals 110-140 and/or of the set of components of one or more of servers and terminals 110-140 (e.g., memory, storage component, input component, output component, communication interface, rendering component).

One or more of servers and terminals 110-140 may further include memory. In some embodiments, the memory may include a random access memory (RAM), a read only memory (ROM), an electrically erasable programmable ROM (EEPROM), a flash memory, a magnetic memory, an optical memory, and/or another type of dynamic or static storage device. The memory may store information and/or instructions for use (e.g., execution) by the processor.

A storage component of one or more of servers and terminals 110-140 may store information and/or computer-readable instructions and/or code related to the operation and use of one or more of servers and terminals 110-140. For example, the storage component may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

One or more of servers and terminals 110-140 may further include an input component. The input component may include one or more components that permit one or more of servers and terminals 110-140 to receive information, such as via user input (e.g., a touch screen, a keyboard, a keypad, a mouse, a stylus, a button, a switch, a microphone, a camera, and the like). Alternatively or additionally, the input component may include a sensor for sensing information (e.g., a global positioning system (GPS) component, an accelerometer, a gyroscope, an actuator, and the like).

An output component of any one or more of servers and terminals 110-140 may include one or more components that may provide output information from the device 100 (e.g., a display, a liquid crystal display (LCD), light-emitting diodes (LEDs), organic light emitting diodes (OLEDs), a haptic feedback device, a speaker, and the like).

One or more of servers and terminals 110-140 may further include a communication interface. The communication interface may include a receiver component, a transmitter component, and/or a transceiver component. The communication interface may enable one or more of servers and terminals 110-140 to establish connections and/or transfer communications with other devices (e.g., a server, another device). The communications may be effected via a wired connection, a wireless connection, or a combination of wired and wireless connections. The communication interface may permit one or more of servers and terminals 110-140 to receive information from another device and/or provide information to another device. In some embodiments, the communication interface may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface may provide for communications with another device via a device-to-device (D2D) communication link, such as FlashLinQ, WiMedia, Bluetooth, ZigBee, Wi-Fi, LTE, 5G, and the like. In other embodiments, the communication interface may include an Ethernet interface, an optical interface, a coaxial interface, an infrared interface, a radio frequency (RF) interface, or the like.

Figure 2:
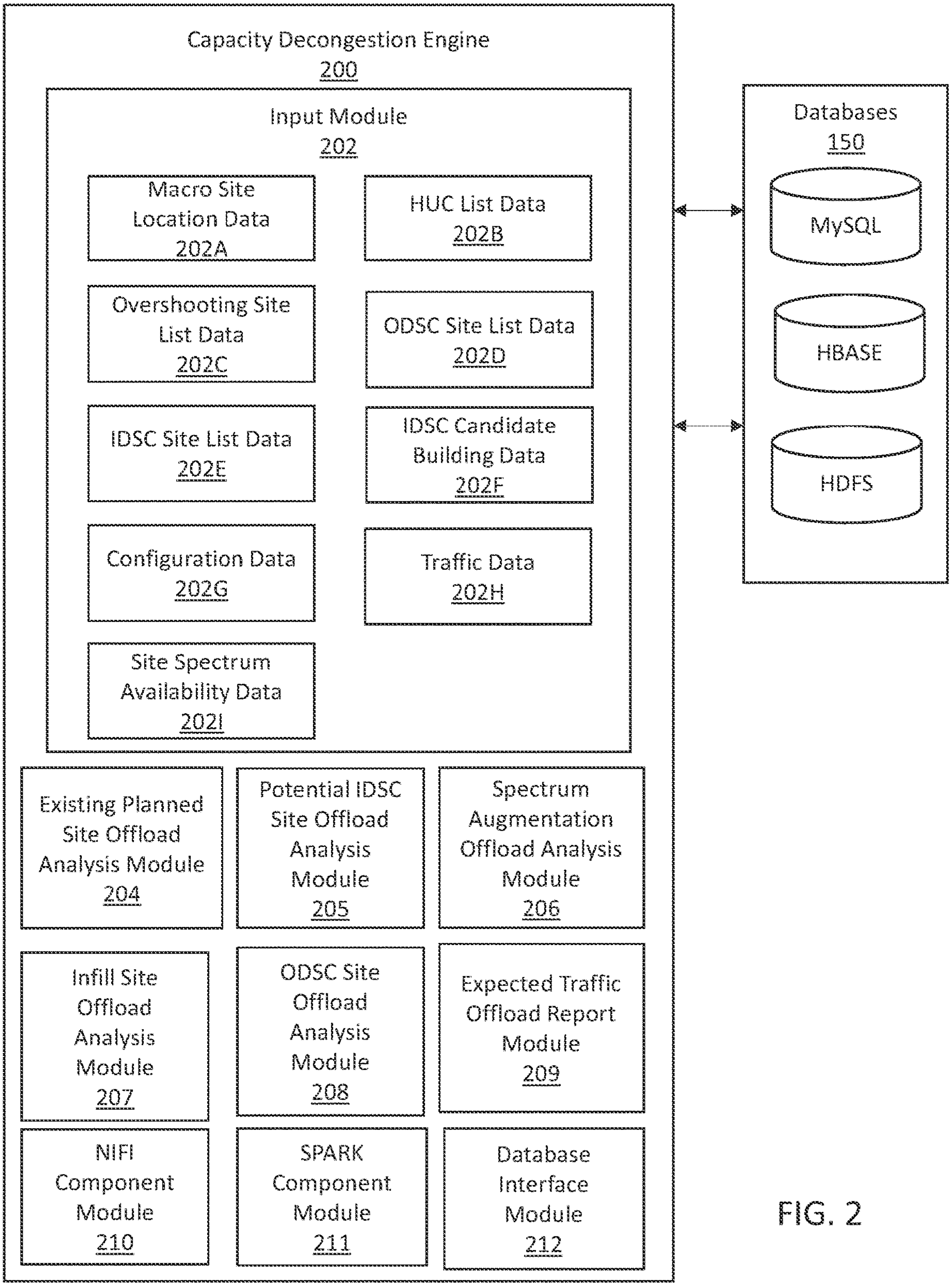
FIG. 2 illustrates a block diagram of a capacity decongestion engine according to one or more embodiments.

FIG. 2 illustrates a block diagram of a capacity decongestion engine according to one or more embodiments. Referring to FIG. 2, the system includes a capacity decongestion engine 200 in bidirectional communication with one or more databases 150, such as MySQL, Hbase, and HDFS via database interface module 212. Here, capacity decongestion engine 200 can include an input module 202 configured to provide input data and parameters to the capacity decongestion algorithm disclosed herein, wherein the input module 202 can further include sub-module input parameters for macro site location data 202A, HUC list data 202B, overshooting site list data 202C, ODSC site list data 202D, IDSC site list data 202E, cell range data 202F, IDSC candidate building data 202G, configuration data 202H, traffic data 202I, and site spectrum availability data 202J. Specifically, the macro site location data 202A can include information from a database for all the macro cell sites within in a network, wherein such information can include, but is not limited to latitude, longitude, azimuth, band details, range, and on air status data, among others. The HUC list data 202B can include a list of cells classified as High Use Cells, where such data can include, but is not limited to, latitude, longitude, azimuth, band details, range, and on air status data associated with each respective HUC, among others. The overshooting site list data 202C can include a list of known overshooting (or "boomer") cell sites (where an "overshooting site" is a cell device whose transmitted radio frequency (RF) signal over-propagates in space, resulting in the cell device serving user equipment (UE) that was not intended to be served by the cell device, or causing excessive interference to neighboring cell devices), where such information can include, but is not limited to, latitude, longitude, azimuth, band details, and on air status data associated with each respective overshooting cell, among others. The ODSC site list data 202D can include a list of existing and planned ODSC sites, where such information can include, but is not limited to, latitude, longitude, azimuth, band details, range, and on air status data associated with each respective existing or planned ODSC site, among others. The IDSC site list data 202E can include a list of existing and planned IDSC sites, where such information can include, but is not limited to, latitude, longitude, azimuth, band details, range, and on air status data associated with each respective existing or planned IDSC site, among others. The IDSC candidate building data 202F can include a list of buildings which may be candidates for installation of an IDSC, where such information can include, but is not limited to, latitude, longitude, building use parameters (e.g., commercial versus residential), and number of floors, among others. The configuration data 202G can include, but is not limited to, information or data related to the execution of the capacity decongestion algorithm disclosed herein such as scheduled run time, initial conditions, and report format, among others. The traffic data 202H can include data volume for any HUC collected during a predetermined reference time, such as a predetermined hour on a predetermined day of the week, and this data may be segregated by site, sector, band, or any other manner. The site spectrum availability data 202I can include information on availability of an additional carrier (i.e., secondary bandwidth) for each identified HUC.

Still referring to FIG. 2, any of the input sub-modules 202A-202I can retrieve data from, or store data to, databases 150, which can include among others, one or more MySQL databases, Hbase, or any other type of relational database management system ("RDBMS"). For example, the MySQL component or module may be utilized for storage of processed data in the framework. This can be utilized for API retrieval and for serving any real-time UI requirements. The aggregated and correlated data may also be stored in MySQL. Further, the capacity decongestion engine 200 may be in communication with an HDFS component or module. Here, the HDFS component or module can be a Hadoop Distributed File System which can be used for storage of raw data. In particular, all batched data sources can be initially stored into HDFS and then processed using Spark jobs, or the Spark module.

Still referring to FIG. 2, the capacity decongestion engine 200 can also include an NiFi component and module 210, or more specifically, an Apache NiFi dataflow system that is based on the concepts of a flow-based programming model that includes the ability to operate within clusters. The NiFi component and module 210 can be used to ingest streaming data from third-party applications, such as Overshooting Cell Identification data from various Entity Management System applications. In addition, the capacity decongestion engine 200 can also include a Spark component and module 211. Here, the Spark component or module 211 can include a parallel processing framework for running large-scale data analytics applications across clustered computers. In particular, the component can handle both batch and real-time analytics and data processing workloads of the capacity decongestion analysis process and system of the disclosure described herein.

Still referring to FIG. 2, the capacity decongestion engine 200 can also include an existing planned site offload process module 204, a potential IDSC site offload process module 205, a spectrum augmentation offload process module 206, an infill site offload process module 207, a potential ODSC site offload process module 208, and an expected traffic offload report module 209. The specific functions of modules 205-208 are described in more detail below.

Figure 3:
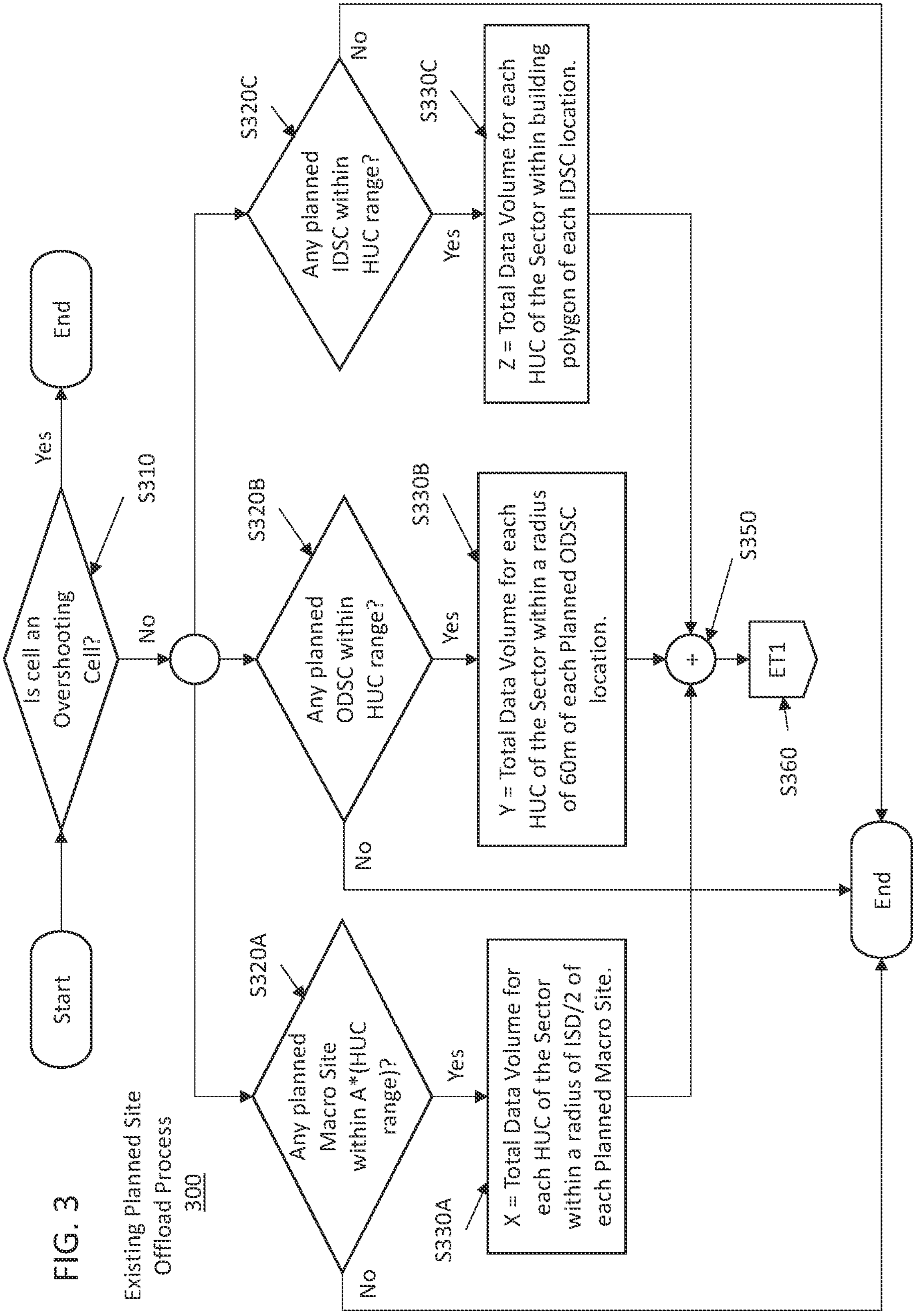
FIG. 3 illustrates a flowchart of an existing planned site offload process and method according to an embodiment.

Referring to FIG. 3, an existing planned site offload process module of an embodiment is described. Specifically, existing planned site offload process 300 is shown, which is operable to determine the potential offload of traffic from a given HUC to existing planned cell locations located within range of the HUC being analyzed for offloading (hereinafter, the "Source HUC"). In an embodiment, process 300 is the process executed by existing planned site offload process module 204. Process 300 includes operation S310, which determines whether the Source HUC is an overshooting cell. If the Source HUC is an overshooting cell, process 300 ends. If the Source HUC is not an overshooting cell, operations S320A, S320B, and S320C are each executed in turn, either serially or in parallel.

Operation S320A determines whether there are any planned macro cell sites within a distance equal to A*(the range of the Source HUC), where "A" is a multiplier that may be adjusted based on the local geography and other factors ("A*(the range of the Source HUC" is hereinafter referred to as the "Macro Range"). If there are no planned macro sites within the Macro Range, operation S320A ends and "X" is set to zero. If it is determined that there are planned macro sites within the Macro Range, operation S330A calculates the total data volume based on Reference Samples taken from each HUC of the Sector containing the HUC being analyzed for offloading within a radius of ISD/2 of each planned macro site within the Macro Range. The total calculated by operation S330A is referred to as "X".

For purposes of this disclosure, "ISD" means the distance between the Source HUC and a planned site. Further, the term "Reference Samples" means data volume samples collected during a pre-determined reference hour, where all such samples are collected on the same day and within the same pre-determined reference hour, thereby creating a data volume snapshot of the relevant portion of the wireless network.

Operation 320B determines whether there are any planned ODSC locations within range of the Source HUC. If there are no planned ODSC locations within range of the Source HUC, operation 320B ends and "Y" is set to zero. If there are planned ODSC locations within range of the Source HUC, operation S330B calculates the total data volume based on Reference Samples taken from each HU Cell of the Sector within a 60 meter radius of each planned ODSC location within range of the Source HUC. The total calculated by operation S330B is referred to as "Y".

Operation 320C determines whether there are any planned IDSC locations within range of the Source HUC. If there are no planned IDSC locations within range of the Source HUC, operation 320C ends and "Z" is set to zero. If there are planned IDSC locations within range of the Source HUC, operation S330C calculates the total data volume based on Reference Samples taken from each HU Cell of the Sector within the building polygon associated with each identified planned IDSC location. The total calculated by operation S330C is referred to as "Z".

Once values are calculated for X, Y, Z, operation S360 adds X, Y, and Z to arrive at total expected offload for planned sites ET1.

Figure 4:
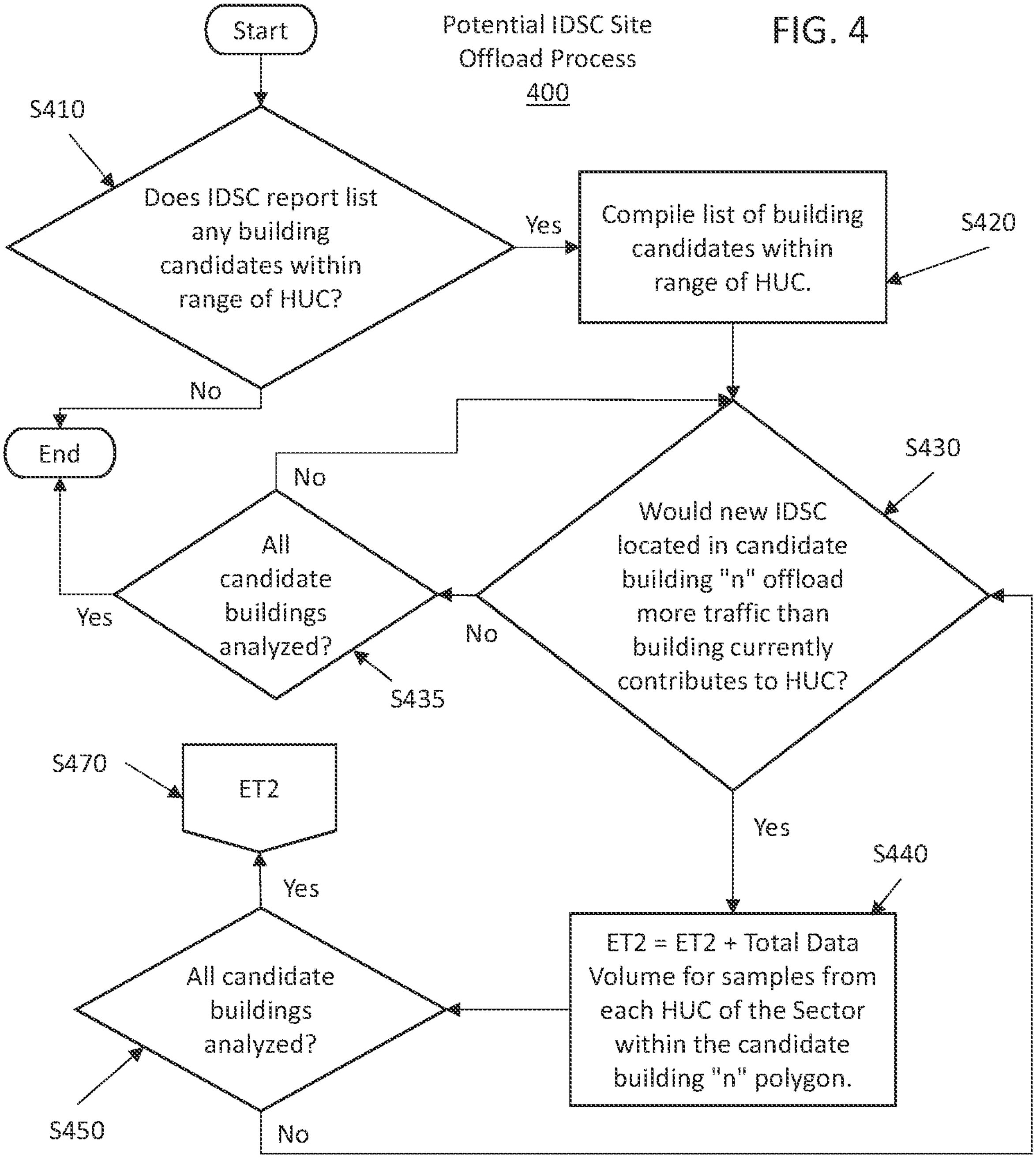
FIG. 4 illustrates a flowchart of a potential IDSC site offload process and method according to an embodiment.

Referring to FIG. 4, potential IDSC site offload process module of an embodiment is described. Specifically, potential IDSC site offload process 400 is shown, which is operable to determine the potential offload of traffic from a Source HUC to a potential location for a new IDSC located within range of the Source HUC. In an embodiment, process 400 is the process executed by existing planned site offload process module 205.

Process 400 includes operation 410 which determines whether available reports describe any buildings within range of the Source HUC which might serve as suitable locations for a new IDSC. In an embodiment, suitable buildings may include residential high-rise buildings greater than or equal to seven floors in height and commercial/enterprise/government buildings less than seven floors in height. However, other parameters may be adopted to determine suitability of a building for location of a new IDSC. If no suitable buildings are identified, then process 400 ends and expected offload for potential IDSC sites ET2 is set to zero. If suitable buildings are identified, said buildings are compiled into a list in operation S420. In operation S430, a determination is made as to whether, for each building "n" included in the list generated by operation S420, a potential IDSC located in said building would be capable of handling more traffic than building "n" currently contributes to the total data volume of the Source HUC. If no, process 400 moves to operation S435, which determines whether each candidate building "n" has been analyzed. If so, process 400 ends. If not, operation S430 repeats with the next candidate building. If operation S430 determines that a new IDSC within a candidate building would offload more traffic from the Source HUC than the candidate building currently contributes to the Source HUC's total data volume, the operation S440 calculates the total data volume based on Reference Samples from each HUC of the Sector within the polygon associated with candidate building "n". Next, operation S450 determines whether all candidate buildings on the list compiled by operation S420 has been analyzed. If all candidates buildings have not been analyzed, process 400 returns to operation S430 and proceeds with analysis of the next building on the list. If all candidate buildings have been analyzed, process 400 ends, with ET2 being equal to the total expected offload for potential IDSC sites.

Figure 5:
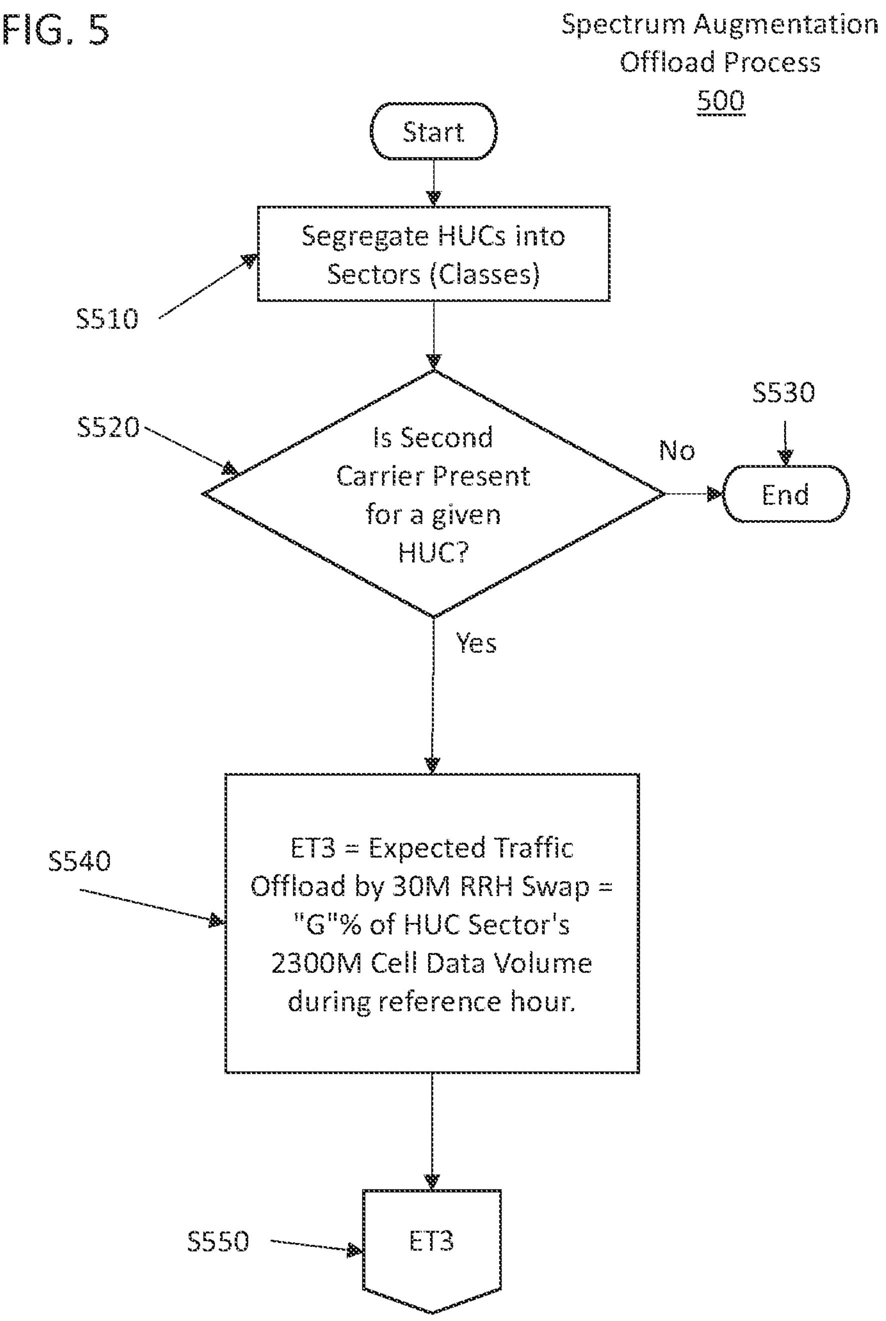
FIG. 5 illustrates a flowchart of a spectrum augmentation offload process and method according to an embodiment.

Referring to FIG. 5, a spectrum augmentation offload process module of an embodiment is described. Specifically, spectrum augmentation offload process 500 is shown, which is operable to determine the potential offload of traffic from a Source HUC to alternative frequency bands available at a given Source HUC. In an embodiment, process 500 is the process executed by existing planned site offload process module 206.

Process 500 includes operation S510, which segregates a given Source HUC into sectors (such as sectors 1110). A sector may include multiple highly utilized cells. Operation S520 then determines whether an alternative carrier (i.e., spectrum band) is present for a given HUC. If no alternative carrier is present, expected offload for spectrum augmentation ET3 is set to zero and process 500 ends. If an alternative carrier is present, operation S540 totals the expected traffic offload available through 30M RRH swap equal to a predetermined percentage ("G") of the HUC Sector's 2300M cell data volume during a given reference hour.

Figure 6:
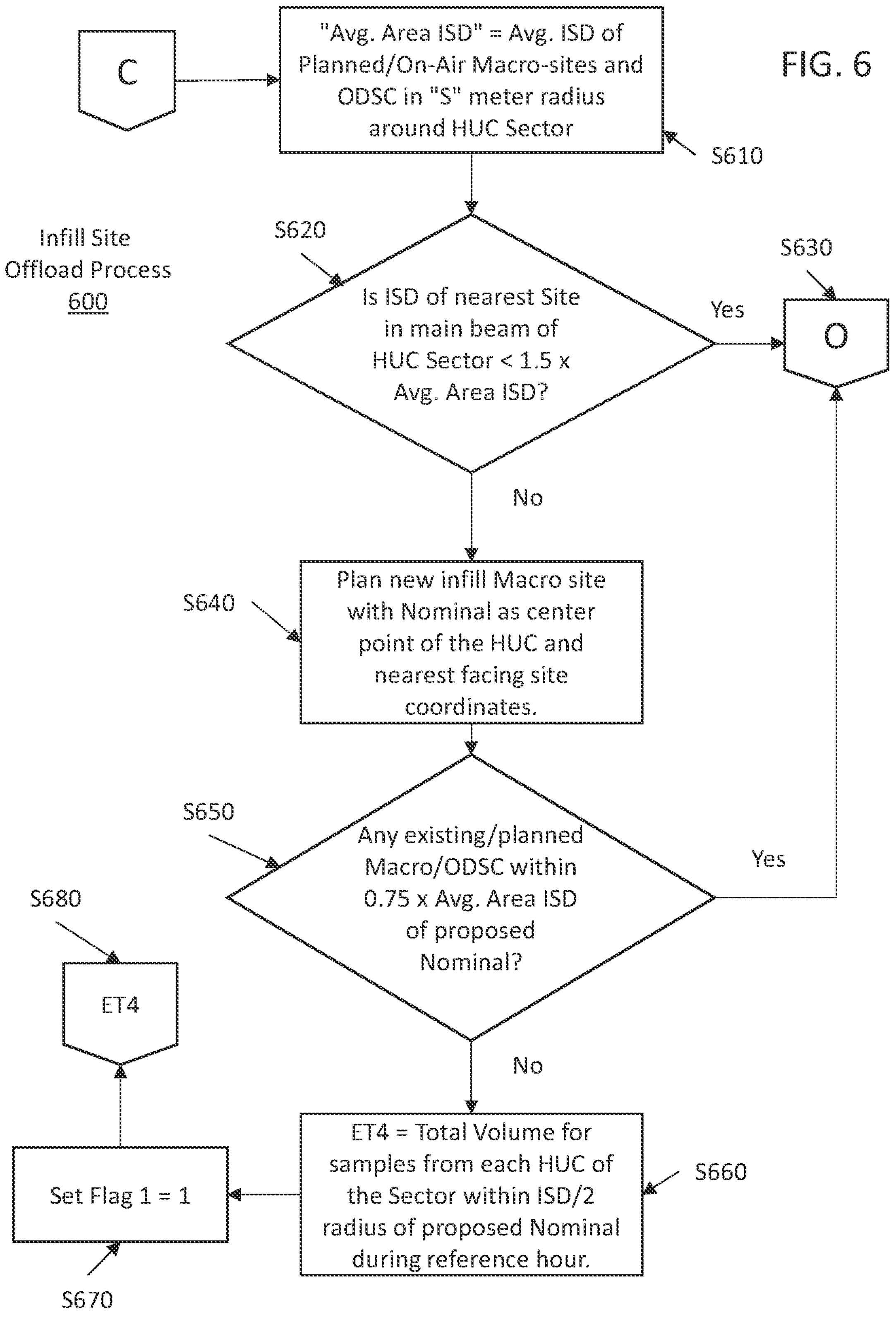
FIG. 6 illustrates a flowchart of an infill site offload process and method according to an embodiment.

Referring to FIG. 6, an infill site offload process module of an embodiment is described. Specifically, infill site offload process 600 is shown, which is operable to propose a new macro or ODSC site and to determine the potential offload of traffic from a Source HUC to said proposed site or sites. In an embodiment, process 600 is the process executed by existing planned site offload process module 207.

Figure 7:
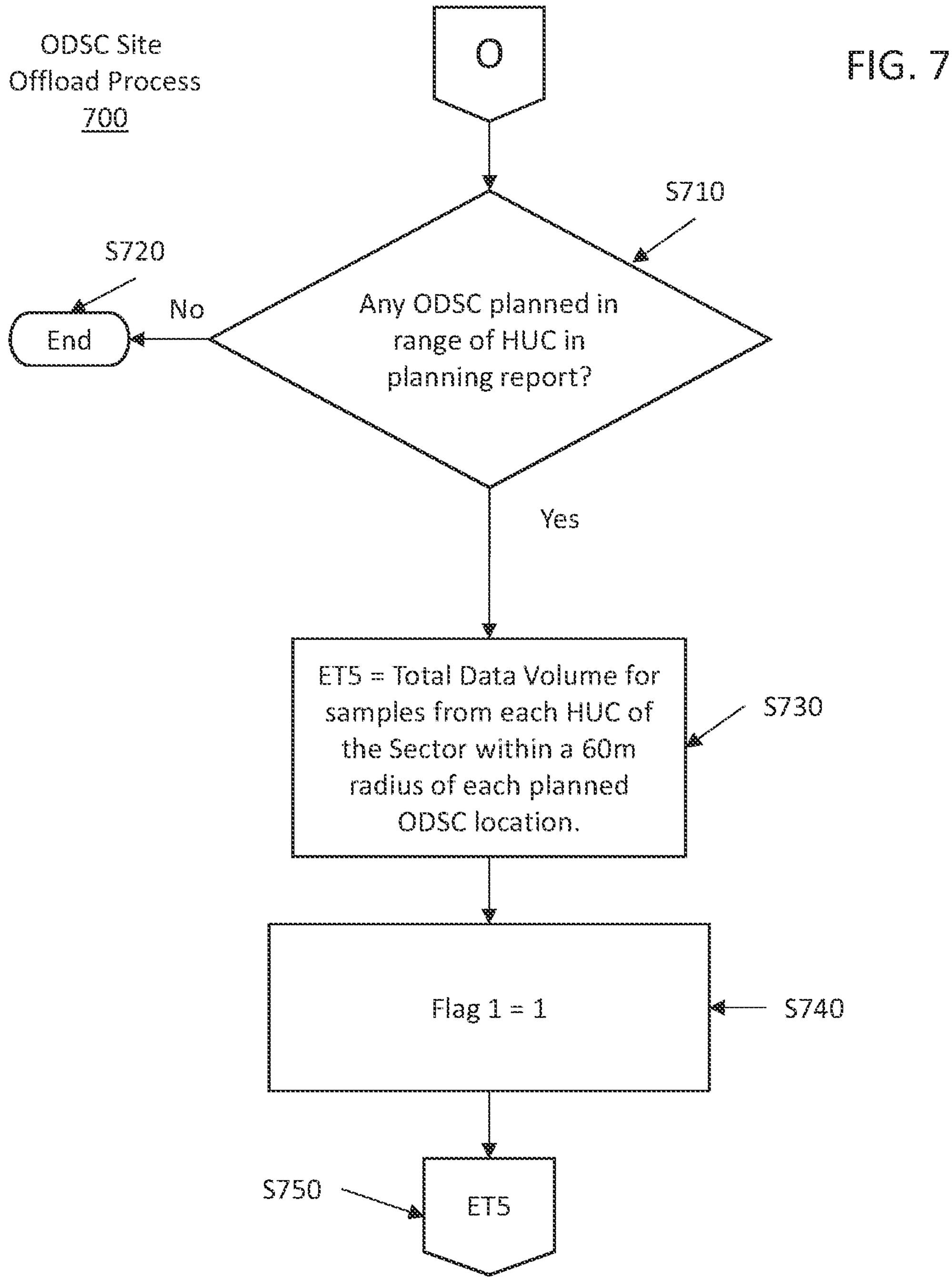
FIG. 7 illustrates a flowchart of an ODSC site offload process and method according to an embodiment.

Process 600 begins with a call from expected traffic offload analysis and report module 800 discussed further below, and includes operation S610 which calculates the value of "Average Area ISD" for a Source HUC, where "Average Area ISD" is equal to Average ISD of all planned and on-air (i.e., operational) macro and ODSC sites within a pre-determined radius "s" around the Source HUC. Operation S620 takes as an input calculated Average Area ISD and determines whether the ISD of the nearest macro or ODSC site (planned or operational) located within the main beam of the Source HUC sector is located within a radius less than 1.5× Average Area ISD. If it is determined that the ISD of the nearest macro or ODSC site (planned or operational) located within the main beam of the Source HUC sector is located within a radius less than 1.5× Average Area ISD, then operation S630 calls potential ODSC site offload process 700 as shown in FIG. 7. Otherwise, process 600 proceeds to operation S640, which proposes a new infill macro site at a nominal location placed at the center point of the Source HUC and the nearest facing site coordinates ("facing site" means a site with an azimuth to the Source HUC). Once the proposal of operation S640 is recorded, operation S650 determines whether there are any planned or operational macro or ODSC sites within 0.75× Average Area ISD of the proposed nominal location of the site proposed by operation S640. If operation S650 determines that such a site exists within the prescribed radius, then process 600 calls potential ODSC site offload process 700 as shown in FIG. 7. If operation S650 does not determine that such a site exists within the prescribed radius, then operation S660 calculates the total data volume based on Reference Samples from each HUC of the Sector containing the Source HUC within a radius of ISD/2 of the nominal location of site proposed by operation S640 and sets ET4 to this calculated value. Operation S670 then sets Flag 1 equal to 1. In certain circumstances, ET4 may not be calculated or may comprise a value based on other, outside conditions. For purposes of this disclosure, a HUC sector means the sector containing the Source HUC being analyzed for decongestion.

Referring to FIG. 7, a ODSC site offload process module of an embodiment is described. Specifically, ODSC site offload process 700 is shown, which is operable to determine the potential offload of traffic from a Source HUC to one or more ODSC sites. In an embodiment, process 700 is the process executed by existing planned site offload process module 208. In an embodiment, process 700 is initiated by operation S630.

Process 700 includes operation S710 which determines whether the ODSC planning report identifies any ODSC sites planned within range of the Source HUC. The ODSC planning report is generated by an algorithm and includes recommended ODSC sites based on a multiple predetermined criteria. Recommended ODSC sites are distinct from planned ODSC sites, as discussed in the context of FIG. 3. Once a recommended ODSC site is selected for planning, it is removed from the list of recommended ODSC sites and added to the list of planned ODSC sites.

If operation S710 does not identify any such planned sites, process 700 ends. If operation S710 does identify one or more planned ODSC sites within range of the Source HUC, operation S730 calculates the total data volume based on Reference Samples from each HUC of the Sector within a 60 meter radius of each planned ODSC location. Expected traffic offload ET5 is set to the total calculated by operation S730. Operation S740 sets Flag 1=1.

Figure 8:
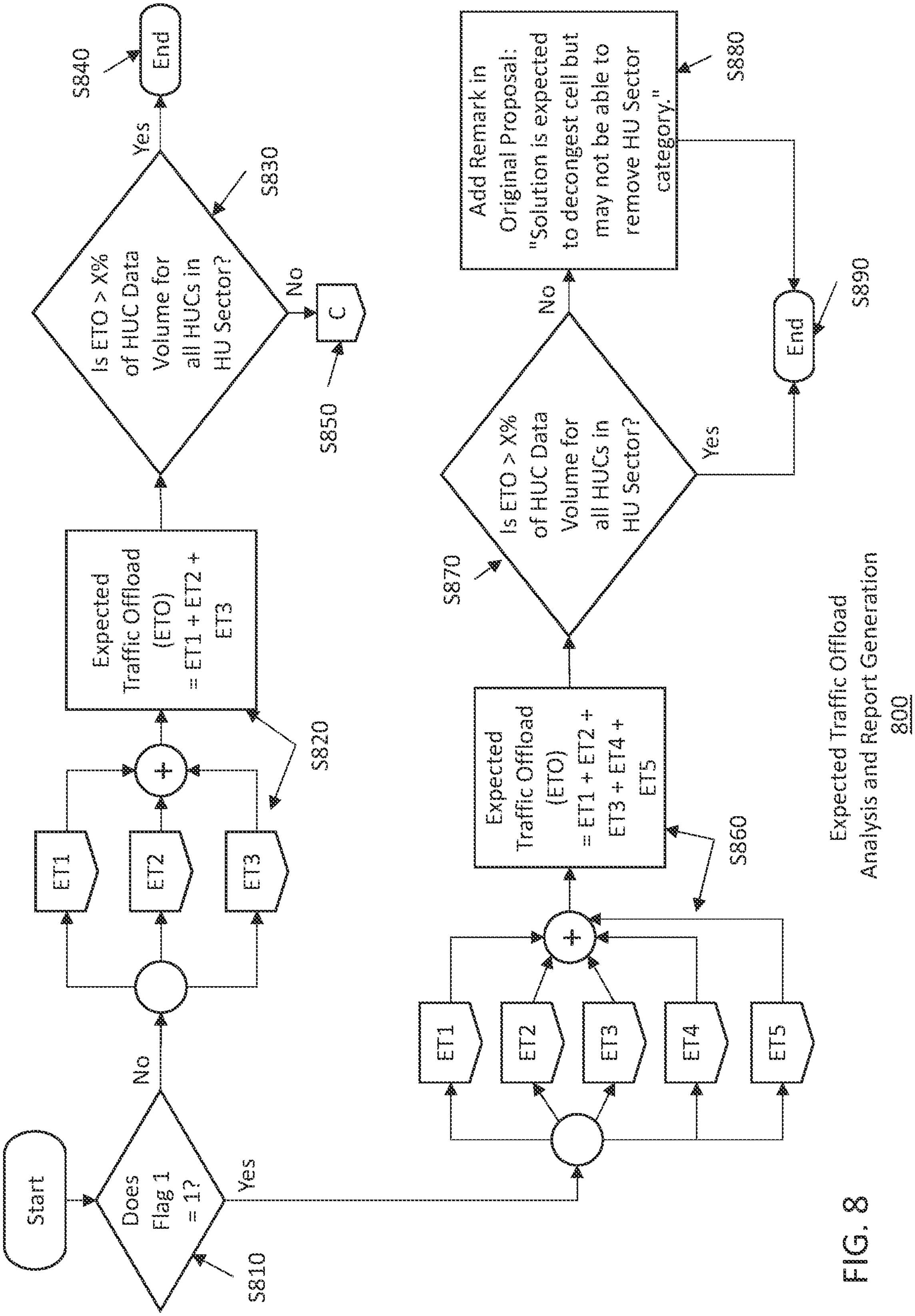
FIG. 8 illustrates an expected traffic offload analysis and report generation process and method according to an embodiment.

Referring to FIG. 8, an expected traffic offload analysis and report generation module of an embodiment is described. Specifically, expected traffic offload analysis and report generation 800 is shown, which is operable to calculate a total expected traffic offload for a given Source HUC and generate a report with recommendations and expected outcomes.

Process 800 includes operation S810 which determines whether Flag 1 is equal to 1 (the initial condition of Flag 1 is zero). If Flag 1 is not equal to 1, then operation S820 adds ET1, ET2, and ET3 to calculate Expected Traffic Offload ET0. Operation S830 then determines whether ET0 is greater than a predetermined percentage X of HUC data volume based on Reference Samples for all HUC's located within the sector containing the Source HUC. If ET0 is found to be greater than percentage X, then process 800 ends. In an embodiment, operation S840 includes generation of a report specifying how a given Source HUC can be decongested via the offloading steps associated with the calculation of ET1, ET2, and ET3. In another embodiment, the steps outlined in said report may be automatically implemented by network management systems or other automated congestion management systems or planning algorithms.

If ETO is found to be less than percentage X, then operation S850 calls process 600 shown in FIG. 6. If operation S810 determines that Flag 1 is equal to 1, then operation S860 adds ET1, ET2, ET3, ET4 and ET5 to calculate Expected Traffic Offload ET0. Operation S870 then determines whether ET0 is greater than a predetermined percentage X of HUC data volume based on Reference Samples for all HUC's located in the sector containing the Source HUC. If ET0 is found to be greater than percentage X, then process 800 ends. If ET0 is not found to be greater than percentage X, then operation S880 adds a special remark to the output report (namely, "Solution is expected to decongest cell but may not be able to remove HU Sector category"), after which process 800 ends.

Figure 9:
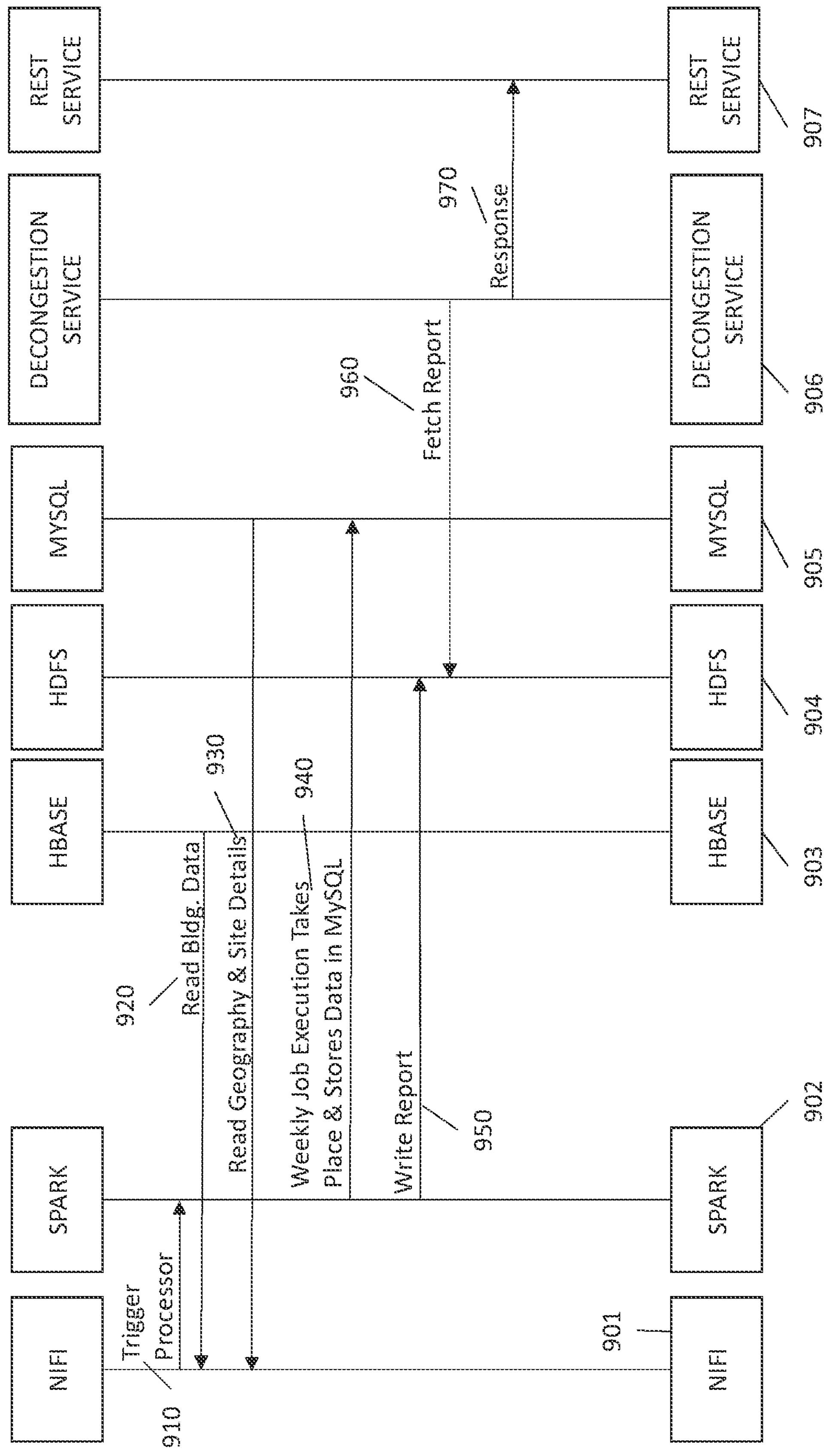
FIG. 9 illustrates an application flow diagram according to an embodiment.

FIG. 9 shows an application flow diagram of an embodiment. As shown, the process begins with NIFI module 901 initiating operation 910 to communication with SPARK module 902 to trigger the processor. NIFI module 901 then performs operation 920 to read building data from HBase 903 and operation 930 to read geography and site details from HDFS 904. SPARK module 902 performs operation 940 to execute a weekly job and to store certain data in MySQL 905. SPARK module 902 then performs operation 950 to write a report which is then communicated to HDFS 904. Decongestion Service 906 initiates operation 960 to fetch the report previously communicated via operation 950. Decongestion Service 906 then communicates a response to rest service 904 via operation 970.

Figure 10:
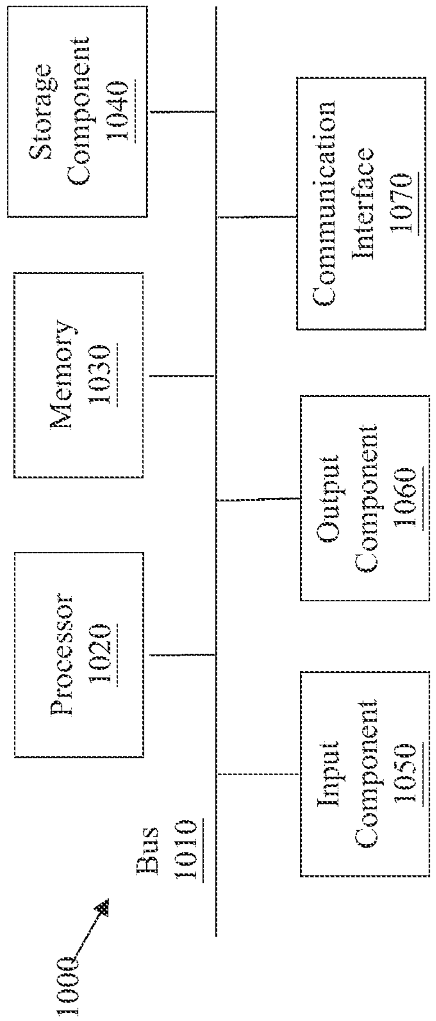
FIG. 10 is a diagram of example components of a device according to an embodiment.

FIG. 10 is a diagram of example components of a device 1000. Device 1000 may correspond to database/third party servers 140, admin terminal 130, central severs 110, user terminals 120, or components associated with cells 100. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000. Processor 1020 may be implemented in hardware, firmware, or a combination of hardware and software. Processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 includes one or more processors capable of being programmed to perform a function. Memory 1030 includes a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes in response to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

In embodiments, any one of the operations or processes of FIGS. 2-9 may be implemented by or using any one of the elements illustrated in FIGS. 1 and 10. It is understood that other embodiments are not limited thereto, and may be implemented in a variety of different architectures (e.g., bare metal architecture, any cloud-based architecture or deployment architecture such as Kubernetes, Docker, OpenStack, etc.).

According to example embodiments, a capacity decongestion engine operable to process information related to network data traffic volume, existing cell sites, planned cell sites, existing alternative bandwidth at given cell sites, and potential placement of new cell sites to provide a proposal to decongest a known high use cell.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of decongesting a highly utilized cell ("HUC") within a sector of a wireless telecommunications network ("Decongestion Target HUC"), the method performed by at least one processor and comprising:

receiving a set of reference samples taken from a plurality of points within the wireless telecommunications network within a predetermined time period;

calculating, based on the set of reference samples, a first data volume comprising a sum of a total data volume for all highly utilized cells within the sector containing the Decongestion Target HUC;

calculating, based on the set of reference samples, a first total expected traffic offload value, wherein the first total expected traffic offload value comprises the sum of a total expected traffic offload from one or more existing planned cell sites, a total expected traffic offload from one or more potential indoor small cell (IDSC) sites, and a total expected traffic offload from one or more available alternative carriers;

determining whether the first total expected traffic offload value is greater than a predetermined percentage of the first data volume; and based on determining that the first total expected traffic offload value is greater than the predetermined percentage of the first data volume, generating one or more outputs configured to implement a decongestion of the Decongestion Target HUC.

2. The method of claim 1, further comprising:

based on determining that the first total expected traffic offload value is less than or equal to the predetermined percentage of the first data volume:

identifying a first group of sites comprising planned or operational macro or outdoor small cell (ODSC) sites located within a predetermined distance of the Decongestion Target HUC;

based on the first group of sites comprising at least one site, calculating an average distance between the Decongestion Target HUC and each site included in the first group of sites ("the Average ISD");

identifying, within the first group of sites, a second group of sites, wherein each site among the second group of sites is located within the main beam of the Decongestion Target HUC;

based on determining that the second group of sites comprises at least one site:

identifying a nearest site from among the second group of sites, wherein the nearest site is a site from among the second group of sites that is closest to the Decongestion Target HUC, and determining whether the nearest site is located a distance from the Decongestion Target HUC that is less than a product of 1.5 and the Average ISD;

based on determining that the nearest site is located at a distance from the Decongestion Target Site that is less than the product of 1.5 and the Average ISD, determining whether a one or more planned ODSC sites are located at a distance from the Decongestion Target Site that is within the predetermined range;

based on determining that the one or more planned ODSC sites are located at a distance from the Decongestion Target Site within the predetermined range, calculating, based on the set of reference samples, a second data volume comprising a sum of a total data volume for each highly utilized cell that is located within the sector containing the Decongestion Target HUC and that is also located within a predetermined radius of a planned ODSC site from among the one or more planned ODSC sites determined to be located within the predetermined range of the Decongestion Target Site;

calculating a second total traffic offload value comprising the sum of the second data volume and the first total traffic offload value;

determining whether the second total expected traffic offload value is greater than the predetermined percentage of the first data volume; and based on determining that the second total expected traffic offload value is greater than the predetermined percentage of the first data volume, generating one or more outputs configured to implement a decongestion of the Decongestion Target HUC.

3. The method of claim 2, further comprising:

based on determining that the second total expected traffic offload value is less than or equal to the predetermined percentage of the first data volume, generating one or more outputs configured to implement a decongestion of the Decongestion Target HUC, wherein the one or more outputs comprises an indication that decongestion of the Decongestion Target HUC may not result in decongestion of the sector containing the Decongestion Target HUC.

4. The method of claim 2, further comprising:

based on determining that either the second group of sites does not comprise at least one site or determining that the nearest site is not located at a distance from the Decongestion Target Site less than the product of 1.5 and the Average ISD, proposing a new macro site location comprising a location midway between the Decongestion Target HUC and a site from among the first group of sites, wherein the site from among the first group of sites is the closest to the Decongestion Target HUC from among the first group of sites and shares a common azimuth with the Congestion Target HUC;

identifying a third group of sites comprising planned or operational macro or ODSC sites located within a predetermined distance of the new macro site location;

based on the third group of sites comprising at least one site, calculating an average distance between the new macro site location and each site included in the third group of sites ("the New Site Average ISD");

determining whether one or more sites included in the third group of sites are located a distance from the new macro site location that is less than or equal to a distance equal to a product of 0.75 and the New Site Average ISD;

based on determining that one or more sites included in the third group of sites are located a distance from the new macro site location that is less than or equal to the distance equal to the product of 0.75 and the New Site Average ISD, determining whether a one or more planned ODSC sites are located at a distance from the Decongestion Target Site that is within the predetermined range;

based on determining that the one or more planned ODSC sites are located at a distance from the Decongestion Target Site within the predetermined range, calculating, based on the set of reference samples, a second data volume comprising a sum of a total data volume for each highly utilized cell that is located within the sector containing the Decongestion Target HUC and that is also located within a predetermined radius of a planned ODSC site from among the one or more planned ODSC sites determined to be located within the predetermined range of the Decongestion Target Site;

calculating a second total traffic offload value comprising the sum of the second data volume and the first total traffic offload value;

determining whether the second total expected traffic offload value is greater than the predetermined percentage of the first data volume; and based on determining that the second total expected traffic offload value is greater than the predetermined percentage of the first data volume, generating one or more outputs configured to implement a decongestion of the Decongestion Target HUC.

5. The method of claim 4, further comprising:

based on determining that the second total expected traffic offload value is less than or equal to the predetermined percentage of the first data volume, generating one or more outputs configured to implement a decongestion of the Decongestion Target HUC, wherein the one or more outputs comprises an indication that decongestion of the Decongestion Target HUC may not result in decongestion of the sector containing the Decongestion Target HUC.

6. The method of claim 4, further comprising:

based on determining that none of the sites included in the third group of sites are located a distance from the new macro site location that is less than or equal to a distance equal to a product of 0.75 and the New Site Average ISD:

identifying a first group of highly utilized cells comprising each highly utilized cell located within the sector containing the Decongestion Target HUC that is located less than or equal to a distance equal to a product of 0.5 and distance between the new macro site location and the Decongestion Target HUC;

calculating, based on the set of reference samples, a third data volume comprising a sum of a total data volume for each highly utilized cell within the first group of highly utilized cells;

calculating a third total traffic offload value comprising the sum of the third data volume and the first total traffic offload value;

determining whether the third total expected traffic offload value is greater than the predetermined percentage of the first data volume; and based on determining that the third total expected traffic offload value is greater than the predetermined percentage of the first data volume, generating one or more outputs configured to implement a decongestion of the Decongestion Target HUC.

7. The method of claim 6, further comprising: based on determining that the third total expected traffic offload value is less than or equal to the predetermined percentage of the first data volume, generating one or more outputs configured to implement a decongestion of the Decongestion Target HUC, wherein the one or more outputs comprises an indication that decongestion of the Decongestion Target HUC may not result in decongestion of the sector containing the Decongestion Target HUC.

8. A system for decongesting a highly utilized cell (HUC) within a sector of a wireless telecommunications network ("Decongestion Target HUC"), the system comprising:

at least one memory configured to store at least one instruction; and at least one processor configured to access the at least one memory and to execute the at least one instruction to:

receive a set of reference samples collected from a plurality of points within the telecommunications system within a predetermined time period;

calculate, based on the set of reference samples, a first data volume comprising a sum of a total data volume for all highly utilized cells within the sector containing the Decongestion Target HUC;

calculate, based on the set of reference samples, a first total expected traffic offload value, wherein the first total expected traffic offload value comprises the sum of a total expected traffic offload from one or more existing planned cell sites, a total expected traffic offload from one or more potential indoor small cell (IDSC) sites, and a total expected traffic offload to from one or more available alternative carriers;

determine whether the first total expected traffic offload value is greater than a predetermined percentage of the first data volume; and based on determining that the first total expected traffic offload value is greater than the predetermined percentage of the first data volume, generate one or more outputs configured to implement a decongestion of the Decongestion Target HUC.

9. The system of claim 8, wherein the processor is further configured to execute the at least one instruction to:

based on determining that the first total expected traffic offload value is less than or equal to the predetermined percentage of the first data volume:

identify a first group of sites comprising planned or operational macro or outdoor small cell (ODSC) sites located within a predetermined distance of the Decongestion Target HUC;

based on the first group of sites comprising at least one site, calculate an average distance between the Decongestion Target HUC and each site included in the first group of sites ("the Average ISD");

identify, within the first group of sites, a second group of sites, wherein each site among the second group of sites is located within the main beam of the Decongestion Target HUC;

based on determining that the second group of sites comprises at least one site:

identify a nearest site from among the second group of sites, wherein the nearest site is a site from among the second group of sites that is closest to the Decongestion Target HUC, and determine whether the nearest site is located a distance from the Decongestion Target HUC that is less than a product of 1.5 and the Average ISD;

based on determining that the nearest site is located at a distance from the Decongestion Target Site that is less than the product of 1.5 and the Average ISD, determine whether a one or more planned ODSC sites are located at a distance from the Decongestion Target Site that is within the predetermined range;

based on determining that the one or more planned ODSC sites are located at a distance from the Decongestion Target Site within the predetermined range, calculate, based on the set of reference samples, a second data volume comprising a sum of a total data volume for each highly utilized cell that is located within the sector containing the Decongestion Target HUC and that is also located within a predetermined radius of a planned ODSC site from among the one or more planned ODSC sites determined to be located within the predetermined range of the Decongestion Target Site;

calculate a second total traffic offload value comprising the sum of the second data volume and the first total traffic offload value;

determine whether the second total expected traffic offload value is greater than the predetermined percentage of the first data volume; and based on determining that the second total expected traffic offload value is greater than the predetermined percentage of the first data volume, generate one or more outputs configured to implement a decongestion of the Decongestion Target HUC.

10. The system of claim 9, wherein the processor is further configured to execute the at least one instruction to:

based on determining that the second total expected traffic offload value is less than or equal to the predetermined percentage of the first data volume, generate one or more outputs configured to implement a decongestion of the Decongestion Target HUC, wherein the one or more outputs comprises an indication that decongestion of the Decongestion Target HUC may not result in decongestion of the sector containing the Decongestion Target HUC.

11. The system of claim 9, wherein the processor is further configured to execute the at least one instruction to:

based on determining that either the second group of sites does not comprise at least one site or determining that the nearest site is not located at a distance from the Decongestion Target Site less than the product of 1.5 and the Average ISD, propose a new macro site location comprising a location midway between the Decongestion Target HUC and a site from among the first group of sites, wherein the site from among the first group of sites is the closest to the Decongestion Target HUC from among the first group of sites and shares a common azimuth with the Congestion Target HUC;

identify a third group of sites comprising planned or operational macro or ODSC sites located within a predetermined distance of the new macro site location;

based on the third group of sites comprising at least one site, calculate an average distance between the new macro site location and each site included in the third group of sites ("the New Site Average ISD");

determine whether one or more sites included in the third group of sites are located a distance from the new macro site location that is less than or equal to a distance equal to a product of 0.75 and the New Site Average ISD;

based on determining that one or more sites included in the third group of sites are located a distance from the new macro site location that is less than or equal to the distance equal to the product of 0.75 and the New Site Average ISD, determine whether a one or more planned ODSC sites are located at a distance from the Decongestion Target Site that is within the predetermined range;

based on determining that the one or more planned ODSC sites are located at a distance from the Decongestion Target Site within the predetermined range, calculate, based on the set of reference samples, a second data volume comprising a sum of a total data volume for each highly utilized cell that is located within the sector containing the Decongestion Target HUC and that is also located within a predetermined radius of a planned ODSC site from among the one or more planned ODSC sites determined to be located within the predetermined range of the Decongestion Target Site;

calculate a second total traffic offload value comprising the sum of the second data volume and the first total traffic offload value;

determine whether the second total expected traffic offload value is greater than the predetermined percentage of the first data volume; and based on determining that the second total expected traffic offload value is greater than the predetermined percentage of the first data volume, generate one or more outputs configured to implement a decongestion of the Decongestion Target HUC.

12. The system of claim 11, wherein the processor is further configured to execute the at least one instruction to:

based on determining that the second total expected traffic offload value is less than or equal to the predetermined percentage of the first data volume, generate one or more outputs configured to implement a decongestion of the Decongestion Target HUC, wherein the one or more outputs comprises an indication that decongestion of the Decongestion Target HUC may not result in decongestion of the sector containing the Decongestion Target HUC.

13. The system of claim 11, wherein the processor is further configured to execute the at least one instruction to:

based on determining that none of the sites included in the third group of sites are located a distance from the new macro site location that is less than or equal to a distance equal to a product of 0.75 and the New Site Average ISD:

identify a first group of highly utilized cells comprising each highly utilized cell located within the sector containing the Decongestion Target HUC that is located less than or equal to a distance equal to a product of 0.5 and distance between the new macro site location and the Decongestion Target HUC;

calculate, based on the set of reference samples, a third data volume comprising a sum of a total data volume for each highly utilized cell within the first group of highly utilized cells;

calculate a third total traffic offload value comprising the sum of the third data volume and the first total traffic offload value;

determine whether the third total expected traffic offload value is greater than the predetermined percentage of the first data volume; and based on determining that the third total expected traffic offload value is greater than the predetermined percentage of the first data volume, generate one or more outputs configured to implement a decongestion of the Decongestion Target HUC.

14. The system of claim 13, wherein the processor is further configured to execute the at least one instruction to:

based on determining that the third total expected traffic offload value is less than or equal to the predetermined percentage of the first data volume, generate one or more outputs configured to implement a decongestion of the Decongestion Target HUC, wherein the one or more outputs comprises an indication that decongestion of the Decongestion Target HUC may not result in decongestion of the sector containing the Decongestion Target HUC.

15. A method of decongesting a highly utilized cell (HUC) within a sector of a wireless telecommunications network ("Decongestion Target HUC"), the method performed by at least one processor and comprising:

receiving a set of reference samples collected from a plurality of points within the wireless telecommunications network during a predetermined time period;

calculating, based on the set of reference samples, a first data volume comprising a sum of a total data volume for all highly utilized cells within the sector containing the Decongestion Target HUC;

determining whether the Decongestion Target Cell is an overshooting cell, and based on determining that the Decongestion Target Cell is not an overshooting cell, identifying one or more planned macro sites within a predetermined distance of the Decongestion Target Cell, and calculating, based on the set of reference samples, a first data volume value comprising a sum of a total data volume of each highly utilized cell located within the sector containing the Decongestion Target Cell and also located within a predetermined distance from an at least one planned macro site from among the identified one or more planned macro sites, identifying one or more planned outdoor small cell (ODSC) sites within a predetermined distance of the Decongestion Target Cell, and calculating, based on the set of reference samples, a second data volume value comprising a sum of a total data volume of each highly utilized cell located within the sector containing the Decongestion Target Cell and also located within a predetermined distance from an at least one planned ODSC site from among the identified one or more planned ODSC sites, identifying one or more planned indoor small cell (IDSC) sites within a predetermined distance of the Decongestion Target Cell, and calculating, based on the set of reference samples, a third data volume value comprising a sum of a total data volume of each highly utilized cell located within a building polygon of an at least one planned IDSC from among the identified one or more planned IDSC sites, and calculating a total expected traffic offload from one or more existing planned cell sites, wherein the total expected traffic offload from one or more existing planned cell sites comprises the sum of the first data volume value, the second data volume value, and the third data volume value;

identify a group of candidate buildings within a predetermined distance of the Decongestion Target HUC;

from among the group of candidate buildings, identify one or more IDSC candidate buildings, wherein an IDSC candidate building is identified based on a determination that, based on the set of reference samples, placement of an IDSC in a respective candidate building from among the group of candidate buildings would offload more data volume from the Decongestion Target HUC than the respective candidate building currently contributes to a total data volume of the Decongestion Target HUC;

calculating, for each respective IDSC candidate building, a data volume contribution value comprising a data value contribution from each respective IDSC candidate building to each highly utilized cell within the sector containing the Decongestion Target Cell, and calculating a total expected traffic offload from one or more potential IDSC sites comprising a sum of each calculated data volume contribution value;

segregating one or more highly utilized cells into sectors;

determining whether an alternative carrier is available at the Decongestion Target Cell;

based on determining that the alternative carrier is available at the Decongestion Target Cell, calculating, based on the set of reference samples, a total expected traffic offload to the alternative carrier comprising a percentage of a data volume of the Decongestion Target Cell which is available to be moved to the alternative carrier;

calculating a first total expected traffic offload value, wherein the first total expected traffic offload value comprises the sum of the total expected traffic offload from one or more existing planned cell sites, the total expected traffic offload from one or more potential IDSC sites, and the total expected traffic offload to the available alternative carriers;

determining whether the first total expected traffic offload value is greater than a predetermined percentage of the first data volume; and based on determining that the first total expected traffic offload value is greater than the predetermined percentage of the first data volume, generating one or more outputs configured to implement a decongestion of the Decongestion Target HUC.

16. The method of claim 15, further comprising:

based on determining that the first total expected traffic offload value is less than or equal to the predetermined percentage of the first data volume:

identifying a first group of sites comprising planned or operational macro or ODSC sites located within a predetermined distance of the Decongestion Target HUC;

based on the first group of sites comprising at least one site, calculating an average distance between the Decongestion Target HUC and each site included in the first group of sites ("the Average ISD");

identifying, within the first group of sites, a second group of sites, wherein each site among the second group of sites is located within the main beam of the Decongestion Target HUC;

based on determining that the second group of sites comprises at least one site:

identifying a nearest site from among the second group of sites, wherein the nearest site is a site from among the second group of sites that is closest to the Decongestion Target HUC, and determining whether the nearest site is located a distance from the Decongestion Target HUC that is less than a product of 1.5 and the Average ISD;

based on determining that the nearest site is located at a distance from the Decongestion Target Site that is less than the product of 1.5 and the Average ISD, determining whether a one or more planned ODSC sites are located at a distance from the Decongestion Target Site that is within the predetermined range;

based on determining that the one or more planned ODSC sites are located at a distance from the Decongestion Target Site within the predetermined range, calculating, based on the set of reference samples, a second data volume comprising a sum of a total data volume for each highly utilized cell that is located within the sector containing the Decongestion Target HUC and that is also located within a predetermined radius of a planned ODSC site from among the one or more planned ODSC sites determined to be located within the predetermined range of the Decongestion Target Site;

calculating a second total traffic offload value comprising the sum of the second data volume and the first total traffic offload value;

determining whether the second total expected traffic offload value is greater than the predetermined percentage of the first data volume; and based on determining that the second total expected traffic offload value is greater than the predetermined percentage of the first data volume, generating one or more outputs configured to implement a decongestion of the Decongestion Target HUC.

17. The method of claim 16, further comprising:

based on determining that the second total expected traffic offload value is less than or equal to the predetermined percentage of the first data volume, generating one or more outputs configured to implement a decongestion of the Decongestion Target HUC, wherein the one or more outputs comprises an indication that decongestion of the Decongestion Target HUC may not result in decongestion of the sector containing the Decongestion Target HUC.

18. The method of claim 16, further comprising:

based on determining that either the second group of sites does not comprise at least one site or determining that the nearest site is not located at a distance from the Decongestion Target Site less than the product of 1.5 and the Average ISD, proposing a new macro site location comprising a location midway between the Decongestion Target HUC and a site from among the first group of sites, wherein the site from among the first group of sites is the closest to the Decongestion Target HUC from among the first group of sites and shares a common azimuth with the Congestion Target HUC;

identifying a third group of sites comprising planned or operational macro or ODSC sites located within a predetermined distance of the new macro site location;

based on the third group of sites comprising at least one site, calculating an average distance between the new macro site location and each site included in the third group of sites ("the New Site Average ISD");

determining whether one or more sites included in the third group of sites are located a distance from the new macro site location that is less than or equal to a distance equal to a product of 0.75 and the New Site Average ISD;

based on determining that one or more sites included in the third group of sites are located a distance from the new macro site location that is less than or equal to the distance equal to the product of 0.75 and the New Site Average ISD, determining whether a one or more planned ODSC sites are located at a distance from the Decongestion Target Site that is within the predetermined range;

based on determining that the one or more planned ODSC sites are located at a distance from the Decongestion Target Site within the predetermined range, calculating, based on the set of reference samples, a second data volume comprising a sum of a total data volume for each highly utilized cell that is located within the sector containing the Decongestion Target HUC and that is also located within a predetermined radius of a planned ODSC site from among the one or more planned ODSC sites determined to be located within the predetermined range of the Decongestion Target Site;

calculating a second total traffic offload value comprising the sum of the second data volume and the first total traffic offload value;

determining whether the second total expected traffic offload value is greater than the predetermined percentage of the first data volume; and based on determining that the second total expected traffic offload value is greater than the predetermined percentage of the first data volume, generating one or more outputs configured to implement a decongestion of the Decongestion Target HUC.

19. The method of claim 18, further comprising:

based on determining that the second total expected traffic offload value is less than or equal to the predetermined percentage of the first data volume, generating one or more outputs configured to implement a decongestion of the Decongestion Target HUC, wherein the one or more outputs comprises an indication that decongestion of the Decongestion Target HUC may not result in decongestion of the sector containing the Decongestion Target HUC.

20. The method of claim 18, further comprising:

based on determining that none of the sites included in the third group of sites are located a distance from the new macro site location that is less than or equal to a distance equal to a product of 0.75 and the New Site Average ISD:

identifying a first group of highly utilized cells comprising each highly utilized cell located within the sector containing the Decongestion Target HUC that is located less than or equal to a distance equal to a product of 0.5 and distance between the new macro site location and the Decongestion Target HUC;

calculating, based on the set of reference samples, a third data volume comprising a sum of a total data volume for each highly utilized cell within the first group of highly utilized cells;

calculating a third total traffic offload value comprising the sum of the third data volume and the first total traffic offload value;

determining whether the third total expected traffic offload value is greater than the predetermined percentage of the first data volume; and based on determining that the third total expected traffic offload value is greater than the predetermined percentage of the first data volume, generating one or more outputs configured to implement a decongestion of the Decongestion Target HUC.

* * * * *